United States Patent [19]

Wagner

[11] E Re. 29,993

[45] Reissued May 15, 1979

[54] GEAR WRENCH

[76] Inventor: Paul H. Wagner, 5203 Much-Birrenbachshöhe, Fed. Rep. of Germany

[21] Appl. No.: 812,413

[22] Filed: Jul. 1, 1977

Related U.S. Patent Documents

Reissue of:

[64] Patent No.: 3,559,507
Issued: Feb. 2, 1971
Appl. No.: 772,634
Filed: Nov. 1, 1968

[30] Foreign Application Priority Data

Nov. 2, 1967 [DE] Fed. Rep. of Germany ... 1982397[U]

[51] Int. Cl.[2] ..... F16H 3/44; B25B 17/00
[52] U.S. Cl. ..... 74/750 R; 81/57.31
[58] Field of Search ..... 74/801, 750 R, 768; 81/57.31

[56] References Cited

U.S. PATENT DOCUMENTS

| | | | |
|---|---|---|---|
| 2,484,364 | 10/1949 | Whitledge | 74/801 |
| 2,715,344 | 8/1955 | Aruntunoff | 74/801 |
| 3,217,565 | 11/1965 | Dietrich | 74/768 X |
| 3,331,269 | 7/1967 | Sauter | 81/57.31 |
| 3,430,521 | 3/1969 | Kulman | 74/750 R |

FOREIGN PATENT DOCUMENTS

| | | | |
|---|---|---|---|
| 879040 | 10/1961 | United Kingdom | 74/801 |
| 929238 | 6/1963 | United Kingdom | 74/801 |

*Primary Examiner*—Lance W. Chandler
*Attorney, Agent, or Firm*—Birch, Stewart, Kolasch & Birch

[57] ABSTRACT

A force multiplication wrench is provided in the form of a casing having a longitudinal input shaft at one end and a longitudinal output shaft at the other end. A transmission, such as a planetary gear unit, is disposed in the housing connecting the two shafts. Tandem planetary gear units may also be used for greater force multiplication. In the case of planetary gears, the inner wall of the housing is adapted as the ring gear.

21 Claims, 6 Drawing Figures

GEAR WRENCH

Matter enclosed in heavy brackets [ ] appears in the original patent but forms no part of this reissue specification; matter printed in italics indicates the additions made by reissue.

This invention relates to a wrench of the socket type for cap screws, wheel nuts and the like in which torsion imparted manually to a transmission, such as planetary gears, is magnified at the head of the wrench.

Often, manual torsion on a conventional wrench is not sufficient to unscrew or tighten heavy caliber screws or nuts. For this reason wrenches have been developed where a sprocket is attached to turn with the head in the manner of a socket. On the axle of the socket a coaxial member is arranged to house gears. One end of the axle is turned like a conventional wrench by a removable transverse lever, and the other end, being the output shaft of the transmission, turns slower according to the gear ratio. Although this type of wrench can be handled like a socket wrench, it is not handy, due to the thickness of the housing, which raises difficulties when used in places that are not easily accessible.

The wrench of the present invention differs from the conventional socket wrench by its shape, compact construction, and relatively small weight. A wide range of application is possible, because gear parts can be removed and replaced in order to change the transmission ratio as desired. Thus, multi-stage gearing is provided, the stages being situated on each central axle in alignment with the input and output shafts.

By a suitable design of a planetary gear unit, both gear stages can have the same transmission, or even the middle gears of both stages and the planet gears of both stages can be made identical. The front part of the casing forms a compact unit together with the shaft, which carries the planet gears of the first transmission unit, and the sun pinion of the second transmission unit. Accordingly, the transmission assembly is essentially facilitated and, moreover, it offers the advantage that, if desired, the unit can be used in a second gear casing, shorter than the first gear casing, in which the sun pinion of the second transmission unit, together with a polygonal end which protrudes from the second casing, is constructed to take up a wrench nut. Because of this, two ratios can be chosen, the one requiring a smaller casing and resulting in smaller dimensions of the wrench.

A third ratio, i.e., 1:1 is possible, due to the fact that the input shaft can be moved axially. A front part on the gear casing and the input shaft, together with certain close fitting parts, have engageable tooth-like jaws. The result is that the shafts can be locked relative to each other when one shaft has been pushed in, thereby bypassing the transmission.

The invention is illustrated in the accompanying drawing in which:

FIG. 1 is a longitudinal sectional view through a wrench comprising an embodiment of the invention.

FIGS. 2 and 3 are, respectively, cross-sectional views along the lines 2—2 and 3—3 of FIG. 1.

Figures 1, 2, 3:
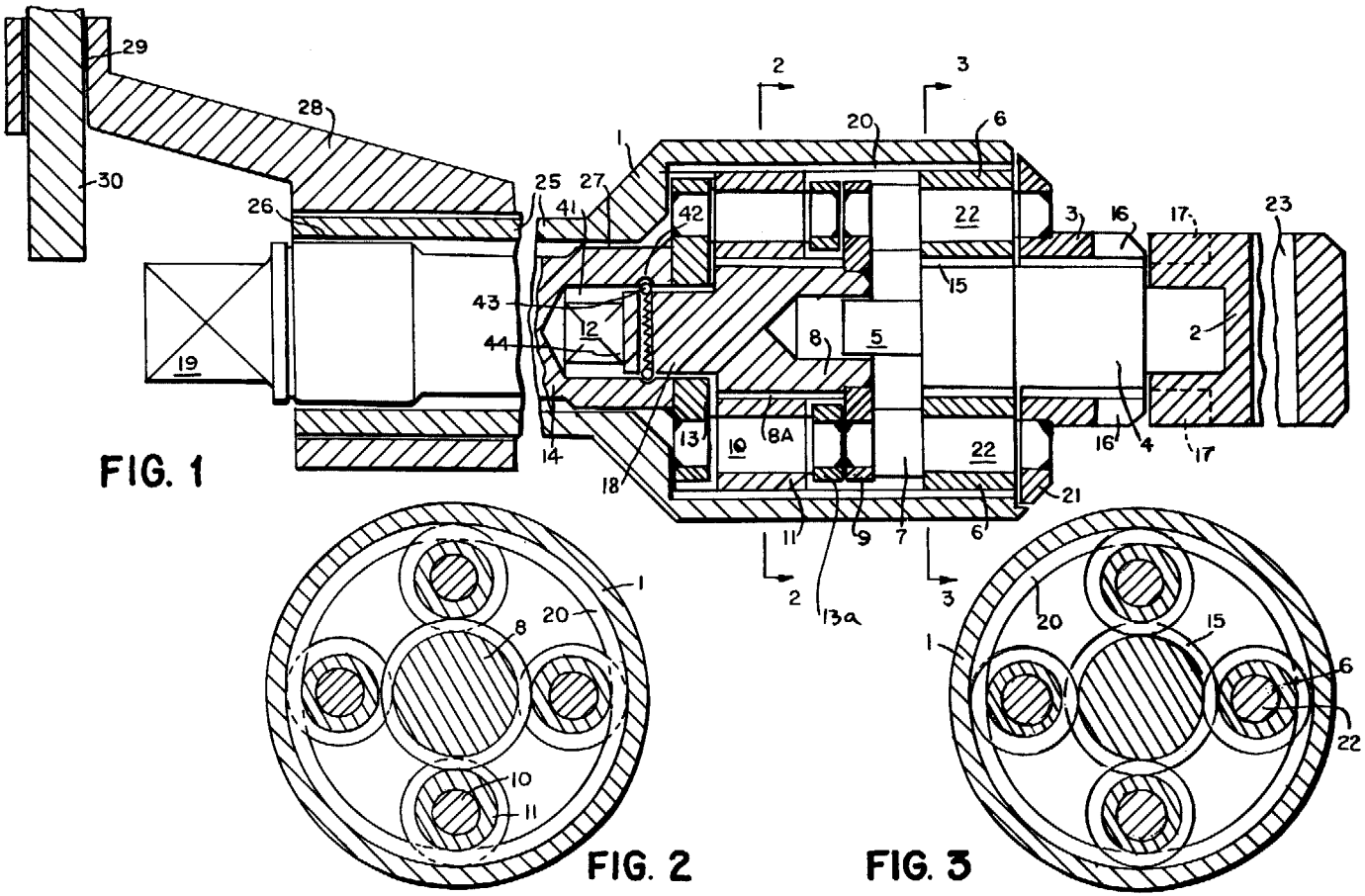

The invention is described in connection with several embodiments illustrated in the accompanying drawing and described in the following specification.

Referring with more particularity to the drawing, the input shaft 4 is secured to a cylindrical knob 2 with a transverse hole 23, for engaging a turning bar (not shown). The shaft 4 is provided along a part of its length with gear teeth 15, meshed with four planet gears 6, which are equally spaced on its circumference. Each planet gear is meshed on the inside with the gear teeth 15 of the input shaft 4, which constitutes the middle gear of the first transmission unit, and on the outside with inner gear teeth 20 of the casing 1. One end of each axle 22 of the planet gears 6 is welded to the front end plate *21* of the gear casing 1. The other ends of the axles are welded to disc 9 of a middle gear 8 of the second transmission unit. The gear teeth 15 of the input shaft has a central bolt 5, which is located in a matching bearing as shown.

The middle gear 8 is also provided with outside gear teeth 8a meshed with four planet gears 11 equally spaced circumferentially. The planet gears 11 are also meshed with the inner teeth 20 of the casing. Their shafts 10 are journalled on one side to a ring 13 which is welded to the output shaft 14. The other side is welded to a ring 13a. The ring 13 and the attached end of the output shaft 14 have a central hole which is a bearing for the central gear 8 of the second transmission unit. A square nipple 12 is attached to the central gear 8 in the direction of the longitudinal axis. The diameter of the holes are such that the movement of a central gear 8 turning nipple 12 will be free. The purpose of the nipple 12 will be explained more fully hereinafter.

The output shaft 14 has an annular groove 42 in which two balls 43 are held under outward bias of a spring 44 radial to the shaft 18.

The casing having the inner teeth 20 extends to the output side into a cylindrical portion 25 of the casing of smaller section. The portion 25 encloses the output shaft 14 which is mounted on conventional bearings (not shown) at 26 and 27. The shaft 14 terminates in a square section 19, which projects out of the casing for removably engaging a rotatable fastening member as shown in U.S. Pat. No. 2,721,591.

The cylindrical part 2 which is secured to the input shaft 4 is, together with the input shaft 4, longitudinally movable. The part 21, which rotates with the planet gears 6 and axles 22 of the first transmission stage, has a tube 3 extending to the outside surrounding the input shaft 4 as far as the cylindrical part 2. The tube 3 and the cylindrical part 2 are, respectively, equipped on opposite sides with meshable jaws 16 and 17. They can be brought into meshed engagement by moving the shaft axially. With this engagement, torsion applied to the cylindrical part acts on the input shaft 4, the middle gear 15 and the planet gears 6. Since both load transmissions have different gear ratios, the gearing is locked and the whole wrench turns under the initial torsion together with all parts. The action of the gearing is thus by-passed completely in this engagement.

One advantage of the invention is that all parts of the wrench can be changed or replaced easily without special tools. The wrench consists only of four mechanical units which can be quickly assembled. At first, when assembling, the output shaft 14 with the ring 13 and the planet gears 11, together with their shafts 10, are placed in the casing 1. Then follows the group of the middle gear 8, the planet gears 6, their shafts 22, the member 21, together with the tube 3 and the input shaft 4, which is connected to the cylindrical part 2.

A special feature of the invention is the advantageous utilization of the cylindrical shape of the gear casing. There are no unnecessary enlargements so that the wrench can be used almost anywhere a simple socket wrench can be used.

The invention is not restricted to wrenches that are equipped with planetary gears. It is also adapted to other types of gears. Planetary gears are preferred, however, due to their concentric construction, which are especially suitable.

The two transmission stages do not require the same dimensions. Furthermore, it is not necessary that the gear casing 1 have its gear teeth 20 extending over both transmission stages.

As mentioned above, a special advantage of the wrench is that parts of it can be put together in a smaller casing to provide a wrench with a smaller ratio. The field of application for such a wrench is work shops and filling stations. For trucks, normally larger screws and nuts are used which need, for uncrewing and tightening, a larger moment of torsion, while, for private cars, a wrench with smaller moment of torsion is sufficient. In the latter case, a smaller and handy tool is desired. Due to its compact belly shape and smaller space it is readily available for use as a wrench for relatively small cars, for example.

Figure 4:
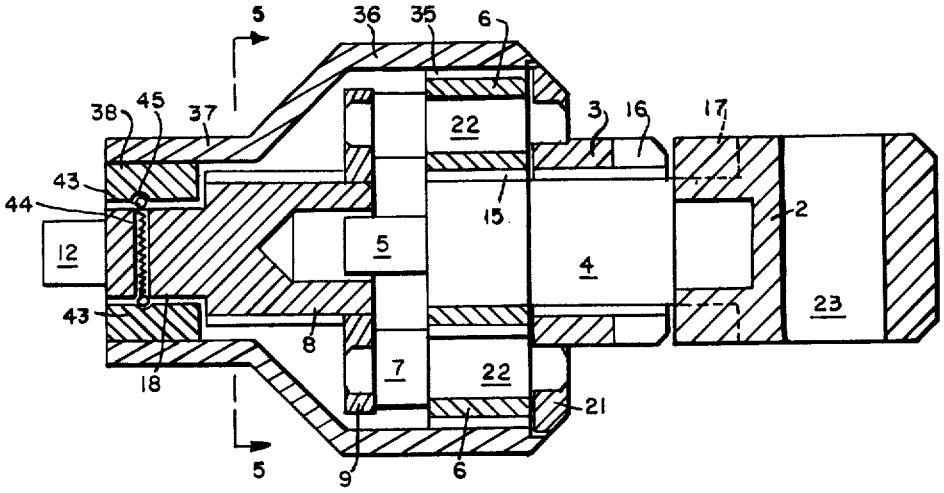
FIG. 4 shows parts of the wrench in connection with a second casing, which represents a one-stage transmission with a smaller ratio.

FIG. 4 shows how parts of the wrench can be assembled when being put into a shorter casing 36 of a different wrench with smaller moment of torsion. The casing 36 is similar to the one of FIG. 1. For housing the gears, the casing 36 is cylindrical just like the casing 1 and, likewise, is equipped with inner gear teeth 35. Since the casing 36 is meant only for a single planetary unit, it is essentially shorter than casing 1. The outside of casing 36 is also conically shaped and it terminates in a short sleeve 37, which is equipped with a bushing 38. In this gear casing there is disposed from the inner side (right) a middle gear 8 of the second transmission stage of the embodiment of FIG. 1, together with the square section 12 at the end of the shaft 18. With this middle gear 8, the shafts 22 of the planet gears 6 of the first transmission stage are connected as mentioned above. The other ends of the shafts 22 are welded to the member 21. The bushing 38 has a groove 45 which is used as a detent for the middle gear 8 with the shaft 18 and balls 43 under bias of spring 44.

In order to assemble the parts of the smaller wrench, the unit of the middle gear 8, the welded disc 9, the shafts 22, the planet gears 6 and the member 21 can be put into the casing 36. After this, the input shaft 4, which is secured to the cylindrical part 2, together with the teeth of the middle gear 15, is disposed between the gears 6. On the output side, the section 12, which, in this case, extends from the casing 36, is now available for taking up a nut. Slipping of the middle gear 15 can also be prevented from the input side, e.g., by the tube 3 of the member 21, in order to obtain, always, complete assembly when changing the parts of the wrench. This can be done simply by taking them out of the pertinent parts of FIG. 1 and putting them into the casing 36.

The casings 1 and 36 can be used together by forcing the casing 36 together with the group according to FIG. 4 into casing 1. In this case, both casings would have to be secured by respective teeth or by locking jaws in order to prevent twisting. But then the inside teeth of the first and second transmission units of casing 1 would have to be put in two different wheel rims, of which the one, facing the inner side, would be of greater diameter. By the last described construction, there would be provided a wrench such as shown in FIG. 4, in which moment of torsion would be increased just by adding a further unit.

Figure 5:
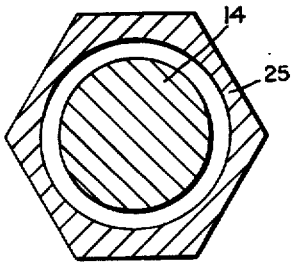
FIGS. 5 and 6 illustrate a special form of device for derivation of bearing pressure which arises while screwing.
Figure 6:
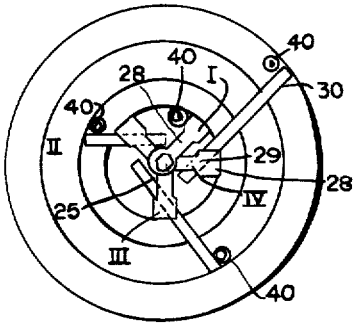

In another form of the invention, the outer surface of the sleeve 25 is hexagonal as shown in FIG. 5. On this hexagon sleeve a support 28 is arranged which can be moved longitudinally. See FIG. 1. This support has a hole 29 drilled in its cylindrical end for the use of an extension arm 30. The support prevents turning of the casing while in use. This is effected by putting it on a fixed point close to the screw to be turned which transmits the twisting force. The support is shown diagrammatically in FIG. 6. The diagram shows the axis of the wrench in the center of several concentrically arranged circles. The hexagon, arranged around the center, marks the outside of the sleeve 25. To make this clearer, a section through the sleeve shows the support 28 in several positions, namely I, II, III and IV. In position 1, a fixed point 40 is indicated, for example, a strut or another screw or bolt, close to the screw to be turned. This is also adjustable in the center which prevents it from turning by opposing the twisting. If, in positions II, III and IV of the support, a fixed point 40 is not available in the vicinity of the screw, a bar 30 is pushed in hole 29. The hole 29 is provided at an angle to the axis of the support 28 in order to be able to put the bar in different positions of extension without being hindered by the adjacent screw (positions III and IV). For position III, a smaller bar may be used. In FIG. 6 the four positions are shown superimposed. However, the support is shown only once in various positions with different distances of a fixed point 40 to the screw 25.

What is claimed is:

1. A hand wrench comprising:

longitudinally aligned input and output shafts[,];

a housing rotatably supporting said shafts in tandem relation[,];

means for holding the housing stationary relative to the shafts[,];

planetary transmission means rotatably connecting said shafts to each other, said transmission means including [pinions and] *a first planetary transmission stage comprising a first sun gear driven by said input shaft*, internal teeth on said housing defining a ring gear and *first group of* planet pinions *driven by said first sun gear and* engaging said ring gear, *and at least a second planetary gear stage comprising a second sun gear carried by and rotatable with said group of planet pinions of the preceding planetary transmission stage and a second group of planet pinions driven by said second sun gear and engaged with said ring gear, said second group of planet pinions comprising output drive means for said second planetary gear stage and said planetary transmission means and connected with said output shaft to drive the latter in rotation;*

[and] a knob for applying a manual force to the input shaft;

the outer end of said output shaft having a non-circular [cross-section] *cross section* for coupling the output shaft to a rotatable fastening member[.];

*means for locking the transmission so as to achieve a direct drive between said shafts.*

[2. A wrench as defined by claim 1, in which the planetary transmission comprises a sun pinion, the said planet pinions engaging the sun pinion and the ring gear.]

[3. A wrench as defined by claim 2, having a second group of planet pinions carried by the first group, said second group being in meshed relation with the teeth of the ring gear and journaled to the output shaft.]

4. A wrench as defined in claim [3] *1*, in which the second group of planet pinions are releasably engaged with teeth of the ring gear.

[5. A wrench as defined in claim 1, and means for locking the transmission against movement so as to achieve a direct drive between said shafts.]

6. [A wrench as defined by claim 1, in which the transmission comprises] *A hand wrench comprising longitudinally aligned input and output shafts, a housing rotatably supporting said shafts in tandum relation, means for holding the housing stationary relative to the shafts, planetary transmission means comprising* tandem planetary gear units [said transmission means] *including pinions and internal teeth on said housing defining a ring gear, a knob for applying a manual force to the input shaft, the outer end of said output shaft having a non-circular cross section for coupling the output shaft to a rotatable fastening member, and means for locking the transmission so as to achieve a direct drive between said shafts.*

7. A wrench as defined by claim 1 and a turning bar for engaging the input shaft for selectively rotating it.

8. A wrench as defined by claim 6, in which one of the planetary units is removable said removable planetary transmission being capable of being combined with a shorter housing to form a more compact hand wrench.

[9. A wrench as defined by claim 6, and means for locking one of the planetary units relative to the other.]

*10. A hand wrench comprising:*

*longitudinally aligned input and output shafts;*

*a housing rotatably supporting said shafts in tandem relation;*

*means for holding the housing stationary relative to the shafts;*

*planetary transmission means rotatably connecting said shafts to each other, said transmission means comprising a plurality of tandem planetary gear stages each including a sun gear as an input, a group of planet pinions as an output and a ring gear formed internally of said housing, said planet pinions mutually engaging said ring gear and a corresponding sun gear;*

*said input shaft driving the first said sun gear;*

*said output shaft being driven by the last said group of planet pinions; a knob for applying a manual force to the input shaft;*

*the outer end of said output shaft having a non-circular cross section for coupling the output shaft to a rotatable fastening member; and*

*means for locking the transmission so as to achieve a direct drive between said shafts.*

*11. A hand wrench as defined in claim 1, wherein said means for holding said housing stationary comprises a support disposed substantially, radially outwardly from the output shaft for preventing the rotation of said housing.*

*12. A hand wrench as defined in claim 1, wherein said means for locking the transmission so as to achieve a direct drive between said shafts comprises a reciprocatable input shaft that locks the first sun gear and first group of planet pinions and the second sun gear and second group of planet pinions relative to each other so as to provide a direct drive between said input and output shafts.*

*13. A hand wrench as defined in claim 6, wherein said means for holding said housing stationary comprises a support disposed substantially, radially outwardly from the output shaft for preventing the rotation of said housing.*

*14. A hand wrench as defined in claim 6, wherein said means for locking the transmission so as to achieve a direct drive between said shafts comprises a reciprocatable input shaft that locks the first planetary gear unit and the second planetary gear unit relative to each other so as to provide a direct drive between said input and output shafts.*

*15. A hand wrench as defined in claim 10, wherein said means for holding said housing stationary comprises a support disposed substantially, radially outwardly from the output shaft for preventing the rotation of said housing.*

*16. A hand wrench as defined in claim 10, wherein said means for locking the transmission so as to achieve a direct drive between said shafts comprises a reciprocatable input shaft that locks a first planetary gear stage and subsequent planetary gear stages relative to each other so as to provide a direct drive between said input and output shafts.*

*17. A hand wrench comprising:*

*longitudinally aligned input and output shafts;*

*a housing rotatably supporting said shafts in tandem relation;*

*planetary transmission means rotatably connecting said shafts to each other, said transmission means including a first planetary transmission stage comprising a first sun gear driven by said input shaft, internal teeth on said housing defining a ring gear and first group of planet pinions driven by said first sun gear and engaging said ring gear, and at least a second planetary gear stage comprising a second sun gear carried by and rotatable with said group of planet pinions of the preceding planetary transmission stage and a second group of planet pinions driven by said second sun gear and engaged with said ring gear, said second group of planet pinions comprising output drive means for said second planetary gear stage and said planetary transmission means and connected with said output shaft to drive the latter in rotation;*

*a support for engaging and holding the housing stationary relative to the shafts, said support being disposed substantially, radially outwardly from said output shaft for preventing the rotation of said housing and said internal teeth which define said ring gear;*

*a knob for applying a manual force to the input shaft; and*

*the outer end of said shaft having a non-circular cross section for coupling the output shaft to a rotatable fastening member.*

*18. A hand wrench defined in claim 17, including means for locking the transmission so as to achieve a direct drive between said shafts.*

*19. A hand wrench defined in claim 18, wherein said means for locking the transmission so as to achieve a direct drive between said shafts comprises a reciprocatable input shaft that locks the first sun gear and first group of planet pinions and the second sun gear and second group of planet pinions relative to each other so as to provide a direct drive between said input and output shafts.*

*20. A hand wrench comprising longitudinally aligned input and output shafts, a housing rotatably supporting said shafts in tandem relation, planetary transmission means comprising tandem planetary gear units including*

*pinions and internal teeth on said housing defining a ring gear, a support for engaging and holding the housing stationary relative to the shafts, said support being disposed substantially, radially outwardly from said output shaft for preventing the rotation of said housing and said internal teeth which define said ring gear, a knob for applying a manual force to the input shaft, and the outer end of said output shaft having a non-circular cross section for coupling the output shaft to a rotatable fastening member.*

*21. A hand wrench comprising:*

*longitudinally aligned input and output shafts;*

*a housing rotatably supporting said shafts in tandem relation;*

*planetary transmission means rotatably connecting said shafts to each other, said transmission means comprising a plurality of tandem planetary gear stages each including a sun gear as an input, a group of planet pinions as an output and a ring gear formed internally of said housing, said planet pinions mutually engaging said ring gear and a corresponding sun gear;*

*said input shaft driving the first said sun gear;*

*said output shaft being driven by the last said group of planet pinions;*

*a support for engaging and holding the housing stationary relative to the shafts, said support being disposed substantially, radially outwardly from said output shaft for preventing the rotation of said housing and said ring gear formed internally of said housing;*

*a knob for applying a manual force to the input shaft; and*

*the outer end of said output shaft having a non-circular cross section for coupling the output shaft to a rotatable fastening member.*

*22. A hand wrench as defined in claim 20, including means for locking the transmission so as to achieve a direct drive between said shafts.*

*23. A hand wrench as defined in claim 22, wherein said means for locking the transmission so as to achieve a direct drive between said shafts comprises a reciprocatable input shaft that locks the first planetary gear unit and the second planetary gear unit relative to each other so as to provide a direct drive between said input and output shafts.*

*24. A hand wrench as defined in claim 21, including means for locking the transmission so as to achieve a direct drive between said shafts.*

*25. A hand wrench as defined in claim 24, wherein said means for locking the transmission so as to achieve a direct drive between said shafts comprises a reciprocatable input shaft that locks a first planetary gear stage and subsequent planetary gear stages relative to each other so as to provide a direct drive between said input and output shafts.*

* * * * *